United States Patent [19]
Vallone et al.

[11] Patent Number: 5,465,524
[45] Date of Patent: Nov. 14, 1995

[54] FISHING LURES HAVING LIGHT SENSITIVE COLOR CHANGE AND METHOD OF PRODUCING

[76] Inventors: Thomas R. Vallone; Salvatore N. Vallone, both of N40 W27474 Glacier Rd., Pewaukee, Wis. 53072

[21] Appl. No.: 388,360

[22] Filed: Feb. 14, 1995

[51] Int. Cl.⁶ .................................................. A01K 85/00
[52] U.S. Cl. ........................ 43/42.32; 43/42.33; 43/42.53; 43/17.6
[58] Field of Search ................................. 43/17.6, 42.32, 43/42.33, 42.53

[56] References Cited

U.S. PATENT DOCUMENTS

| | | | |
|---|---|---|---|
| 2,202,519 | 5/1940 | Ferris | 43/17.6 |
| 3,390,478 | 7/1968 | McKnight | 43/17.6 |
| 3,935,659 | 2/1976 | McCallum . | |
| 3,936,970 | 2/1976 | Hodges | 43/17.6 |
| 4,638,584 | 1/1987 | Lindsay . | |
| 4,676,020 | 6/1987 | Taylor et al. . | |
| 4,731,948 | 3/1988 | Helton . | |
| 4,787,167 | 11/1988 | Wroclawski | 43/42.32 |
| 4,831,765 | 5/1989 | Bradshaw . | |
| 4,835,899 | 6/1989 | Helton | 43/42.33 |
| 4,870,776 | 10/1989 | Schock . | |
| 5,005,311 | 4/1991 | Dawson et al. . | |
| 5,044,110 | 9/1991 | Henderson et al. . | |
| 5,222,320 | 6/1993 | Erickson . | |
| 5,222,797 | 6/1993 | Holland . | |
| 5,408,780 | 4/1995 | Chambers | 43/42.33 |

*Primary Examiner*—Kurt Rowan
*Attorney, Agent, or Firm*—Andrus, Sceales, Starke & Sawall

[57] ABSTRACT

The present invention discloses a method of producing light sensitive fishing lures and fishing lures which are capable of reversibly changing color with changing exposure to a light source. In one embodiment, a photochromatic material is incorporated into the mold to form a flexible bodied fishing lure. In another embodiment, the photochromatic material is mixed with a bonding agent forming a spray or dip in which a rigid bodied fishing lure is coated. In both cases, the fishing lure has an original, first color which reversibly changes to a second color with exposure to light, and thereafter gradually changes back to the original, first color in the absence of light such as when traveling under water.

14 Claims, 1 Drawing Sheet

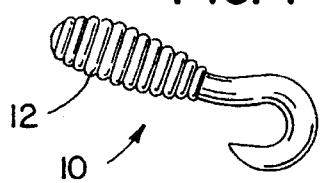
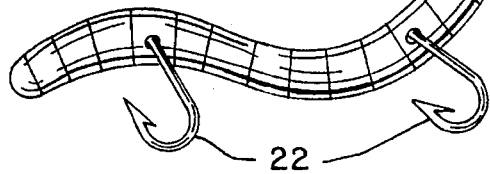
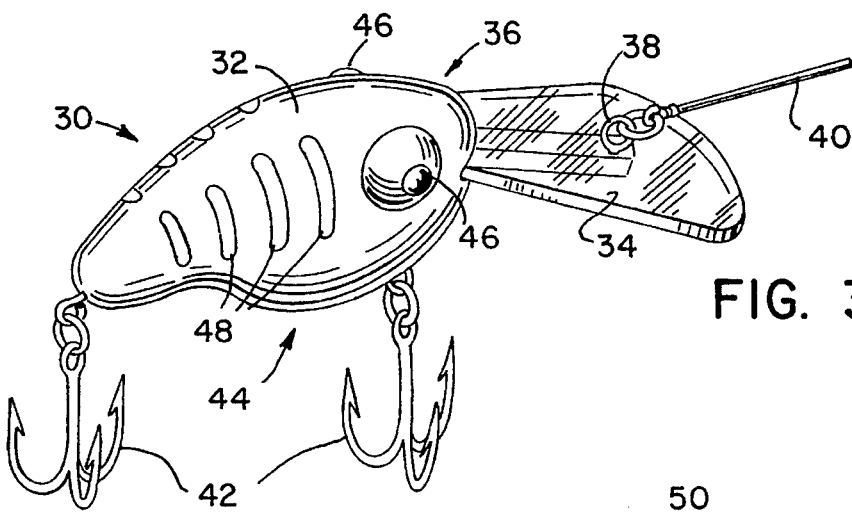
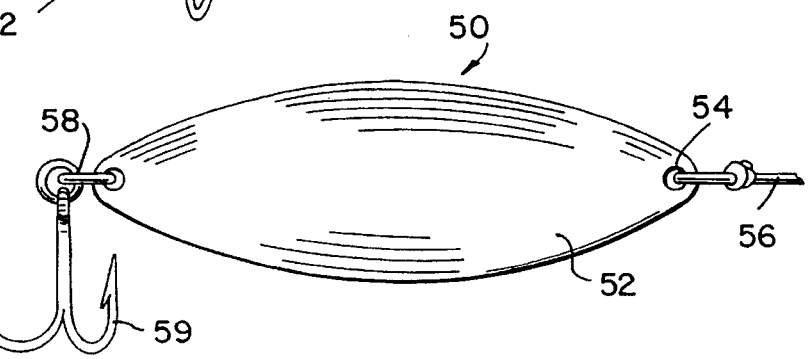
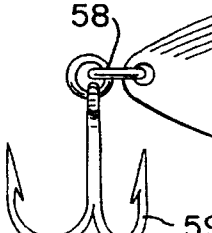
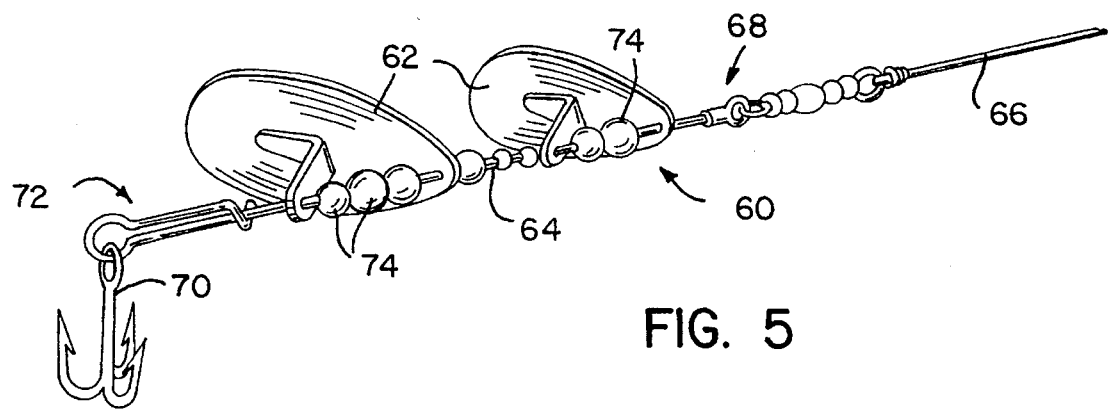

FISHING LURES HAVING LIGHT SENSITIVE COLOR CHANGE AND METHOD OF PRODUCING

BACKGROUND OF THE INVENTION

The invention relates to fishing lures, and more particularly to fishing lures that are capable of changing colors.

The general concept of color changing fishing lures is known in the art, for example, U.S. Pat. Nos. 4,731,948; 4,835,899; and 5,222,320 disclose fishing lures that are capable of changing colors dependent on temperature. These thermally responsive fishing lures change colors in response to changing water temperatures that the fishing lure travels through.

Other types of visually dynamic fishing lures include those which are described as chemiluminescent, wherein the mixture of two compounds produces a luminescent glow, as described in U.S. Pat. 4,638,584. However, these types of fishing lures require replacement of the compounds to reproduce the luminescent glow.

SUMMARY OF THE INVENTION

The present invention provides a fishing lure having a photochromatic material either incorporated into a molded body, or coated over a rigid body. The photochromatic material causes the fishing lure to reversibly change color with changing exposure to a light source, such as sunlight. On cloudy or hazy days, a camera flash or other ultraviolet light source may be used to develop the second color of the photochromatic fishing lure.

The fishing lure of the present invention has an original, first color which reversibly changes to a second color with exposure to the light source. The photochromatic fishing lure gradually changes back to the first color depending upon the degree of light penetrating the water. For example, in shallow or clear water, sunlight can easily penetrate the water and reach the photochromatic fishing lure causing a slow color reversal. In deep or murky waters where sunlight is scarce, the change is more rapid.

New or existing fishing lures may be adapted to produce the desired effect by spraying the fishing lures with a mixture of photochromatic material and a bonding agent such as lacquer, paint, acrylic varnish, or urethane. Alternatively, the fishing lure may be dipped in the mixture.

Various other benefits, objects and advantages of the invention will be made apparent from the following detailed description taken together with the drawings.

BRIEF DESCRIPTION OF THE DRAWINGS

FIG. 1 is a perspective view of a fishing lure having a molded body and in accordance with the present invention.

FIG. 2 is a perspective view of another embodiment of a fishing lure similar to FIG. 1 and in accordance with the present invention.

FIG. 3 is a perspective view of a fishing lure having a rigid body and in accordance with the present invention.

FIG. 4 is a perspective view of another embodiment similar to FIG. 3 and in accordance with the present invention.

FIG. 5 is a perspective view of another embodiment similar to FIG. 3 and in accordance with the present invention.

DETAILED DESCRIPTION OF THE PREFERRED EMBODIMENTS

FIG. 1 shows a fishing lure 10 having a molded body 12 in the form of a common grub. Molded body 12 is capable of having a hook (not shown) inserted through body portion 12. The molded body fishing lure 10 has a photochromatic material incorporated into the mold as it is formed.

The photochromatic material used is typically an ester or alkyd based dye. Such photochromatic dyes are sold under the tradename VARICOL PHOTO DYES™ by Enichem Synthesis, Via Medicidel Vascello, 40, 20138 Milano, Italy, or PHOTOPIA COLOR™ by Matsui Skikiso Chemical Company, Kyoto 607, Japan.

FIG. 2 shows another molded fishing lure 20 molded in the shape of an artificial worm. Fishing lure 20 has multiple fishing hooks 22 attached to the sides, and eyelet 26 attached at one end for tying a fishing line thereto. The fishing lure of FIG. 2 has photochromatic material incorporated into the molded body as previously described with reference to FIG. 1.

FIG. 3 shows a fishing lure 30 having a rigid body 32 in the general configuration and appearance of a small fish. Rigid body 32 is composed of rigid plastic and capable of being overcoated. Rigid body 32 has transparent plastic lip 34 attached at the front mouth area 36. Transparent plastic lip 34 has eyelet 38 for securing a fishing line 40 to fishing lure 30. A pair of three prong hooks 42 are attached on bottom 44 of fishing lure 30. Projections 46 are decorated to simulate the eyes of a fish and decorative strips 48 simulate fish scales. In accordance with the present invention, rigid body 32 is decorated and painted with standard materials used for decorating fishing lures, then an overcoat of clear photochromatic coating is sprayed on the fishing lure, or alternatively, the fishing lure is dipped in the photochromatic coating. The photochromatic coating comprises a mixture of the photochromatic material previously described with reference to FIG. 1, and a bonding agent which can include clear lacquer, acrylic varnish, polyurethane, or waterproof paint.

FIG. 4 shows a fishing lure 50 having a rigid body 52 comprised of metal or rigid plastic with an appearance of polished metal. Fishing lure 50 is generally known as a spoon and has an eyelet 54 for attaching a fishing line 56 at one end and a second eyelet 58 for attaching a fishhook 59 at another end. An overcoat of photochromatic coating is applied to rigid body 52 as previously described with reference to FIG. 3.

FIG. 5 shows a fishing lure 60 in a common spinner configuration having multiple rigid bodies 62 comprised of metal or plastic having a polished metal appearance and being slidably attached on wire 64. Fishing line 66 is attached to a front end 68 of fishing lure 60, and fishhook 70 is attached at a rear end 72 of fishing lure 60. An overcoat of photochromatic coating is applied to rigid body 60 as previously described with reference to FIG. 3. Fishing lure 60, in the form of a spinner, also has various other fish attracting decoration 74, which may also be coated with the photochromatic coating.

It is recognized that equivalents, alternatives, and modifications are possible, and within the scope of the appending claims.

We claim:

1. A fishing lure comprising a molded body having a photochromatic material incorporated into the molded body, the photochromatic material causing the fishing lure to reversibly change color when exposed to a light source.

2. The fishing lure of claim 1 wherein the molded body changes color from an original color to a second color when exposed to a light source and gradually reverts back to the original color in the absence of the light source.

3. A fishing lure comprising a rigid body having a first color and coated with a photochromatic coating capable of reversibly changing the first color of the rigid body to a second color with exposure to a light source, and in the absence of the light source, gradually changing back to the first color.

4. The fishing lure of claim 3 wherein the photochromatic coating comprises a mixture of photochromatic dye and a bonding agent.

5. The fishing lure of claim 4 wherein the bonding agent is a paint.

6. The fishing lure of claim 4 wherein the bonding agent is a synthetic organic coating.

7. The fishing lure of claim 6 wherein the bonding agent is acrylic varnish.

8. The fishing lure of claim 6 wherein the bonding agent is lacquer.

9. The fishing lure of claim 4 wherein the bonding agent is a polyurethane.

10. The fishing lure of claim 3 wherein the photochromatic coating is applied by spraying the photochromatic coating onto the rigid body of the fishing lure.

11. The fishing lure of claim 3 wherein the photochromatic coating is applied by dipping the rigid body of the fishing lure into the photochromatic coating.

12. A method of producing light sensitive color changing fishing lures having rigid bodies comprising the step of coating the rigid body of a fishing lure with a coating comprising a mixture of photochromatic material and bonding agent.

13. The method of claim 12 wherein the step of coating is applied by spraying the photochromatic coating onto the rigid body of the fishing lure.

14. The method of claim 12 wherein the step of coating is applied by dipping the rigid body of the fishing lure into the photochromatic coating.

* * * * *